(12) United States Patent
Yanagihara et al.

(10) Patent No.: US 11,369,193 B2
(45) Date of Patent: Jun. 28, 2022

(54) MULTIFUNCTIONAL DESK

(71) Applicant: Willow Inc., Moriguchi (JP)

(72) Inventors: Tomonari Yanagihara, Moriguchi (JP); Hideo Kita, Moriguchi (JP); Jun Takaishi, Moriguchi (JP)

(73) Assignee: WILLOW INC., Moriguchi (JP)

( * ) Notice: Subject to any disclaimer, the term of this patent is extended or adjusted under 35 U.S.C. 154(b) by 0 days.

(21) Appl. No.: 17/255,047

(22) PCT Filed: Feb. 18, 2020

(86) PCT No.: PCT/JP2020/006332
§ 371 (c)(1),
(2) Date: Dec. 22, 2020

(87) PCT Pub. No.: WO2020/171078
PCT Pub. Date: Aug. 27, 2020

(65) Prior Publication Data
US 2021/0219714 A1 Jul. 22, 2021

(30) Foreign Application Priority Data

Feb. 19, 2019 (JP) .............................. JP2019-027077

(51) Int. Cl.
*A47B 21/03* (2006.01)
*A47B 13/08* (2006.01)

(52) U.S. Cl.
CPC ............ *A47B 21/03* (2013.01); *A47B 13/088* (2013.01)

(58) Field of Classification Search
CPC ............ E05B 17/2034; E05B 17/2053; E05B 85/243; E05B 85/26; E05C 3/12;
(Continued)

(56) References Cited

U.S. PATENT DOCUMENTS

| 4,054,096 A | 10/1977 | Wilson et al. |
| 4,703,961 A * | 11/1987 | Weinerman ............... E05C 3/24 |
| | | 292/216 |

(Continued)

FOREIGN PATENT DOCUMENTS

| JP | S52-138240 A | 11/1977 |
| JP | S55-163848 U | 11/1980 |

(Continued)

OTHER PUBLICATIONS

Office Action of the corresponding Japanese Application 2019-027077, drafted on Apr. 26, 2019, 10 pp.

(Continued)

*Primary Examiner* — Janet M Wilkens
(74) *Attorney, Agent, or Firm* — United IP Counselors, LLC (57) ABSTRACT

A multifunctional desk includes a top plate, a leg portion that supports the top plate in air, a rotating shaft provided below and parallel to the top plate, a rotating plate provided below the top plate, a first fixture, a second fixture, and a slide plate provided below the top plate and above the rotating plate. The first fixture fixes the rotating plate to the top plate or releases the rotating plate from being fixed to the top plate in a state of protruding in front of the top plat. The second fixture fixes the rotating plate to the top plate or releases the rotating plate from being fixed to the top plate in a state of being retreated below the top plate. The slide plate protrudes in front of the top plate or is retreated below the top plate by sliding in parallel to the top plate.

9 Claims, 8 Drawing Sheets (58) Field of Classification Search
CPC . E05C 3/16; E05C 3/165; E05C 3/167; E05C 3/22; E05C 3/24; E05C 3/26; E05C 3/30; E05C 3/38; E05C 3/40; Y10T 292/1047; Y10T 292/1048; Y10T 292/1059; Y10T 292/1078; Y10T 292/108; Y10T 403/59; Y10T 403/599; Y10T 403/60; Y10T 403/602; Y10T 403/604; Y10T 403/608; Y10S 292/11; A47B 21/03; A47B 21/007; A47B 13/088; A47B 2021/0335
USPC ........... 312/194, 195, 223.3, 208.1; 108/102, 108/50.01, 50.02
See application file for complete search history.

(56) References Cited

U.S. PATENT DOCUMENTS

| | | | | |
|---|---|---|---|---|
| 5,094,514 A | * | 3/1992 | Grosch | A47B 21/007 312/194 |
| 5,595,428 A | * | 1/1997 | Huang | A47B 21/0314 312/223.3 |
| 5,655,823 A | * | 8/1997 | Schairbaum | A47B 21/007 312/194 |
| 5,957,059 A | * | 9/1999 | Burhman | A47B 21/007 108/13 |
| 7,140,649 B1 | * | 11/2006 | Gregory | E05C 3/24 292/48 |
| 2003/0001464 A1 | * | 1/2003 | Kelley | A47B 21/0314 312/208.1 |
| 2003/0230222 A1 | | 12/2003 | Liu | |
| 2007/0080554 A1 | * | 4/2007 | Willing | B60N 2/919 296/65.03 |

FOREIGN PATENT DOCUMENTS

| | | | |
|---|---|---|---|
| JP | H01-081927 U | | 6/1989 |
| JP | 2005-118508 A | | 5/2005 |
| JP | 2008-264188 A | | 11/2008 |
| KR | 2004104224 | * | 12/2004 |
| WO | 2007018405 | * | 2/2007 |
| WO | 2008116841 | * | 2/2008 |

OTHER PUBLICATIONS

International Search Report for International Application No. PCT/JP2020/006332, dated Apr. 14, 2020, 3 pp.

* cited by examiner

FIG. 8 too long the state in which the office work is performed to the state in which the game by the controller is played.

BRIEF DESCRIPTION OF THE DRAWINGS

FIGS. 1(a) and 1(b) are views illustrating a multifunctional desk according to the present disclosure, in which

FIGS. 4(a) and 4(b) are views illustrating a first fixture that constitutes the multifunctional desk illustrated in FIGS. 1(a) and 1(b), in which

FIGS. 6(a) and 6(b) are views illustrating the first fixture that constitutes the multifunctional desk illustrated in FIGS. 1(a) and 1(b), illustrating the state where the front frame in front view is detached, in which

FIGS. 7(a) and 7(b) are views illustrating the first fixture that constitutes the multifunctional desk illustrated in FIGS. 1(a) and 1(b), illustrating the state where the front frame in front view is detached, in which

DETAILED DESCRIPTION

Next, embodiments of the present disclosure will be described in detail with reference to the drawings. In FIGS. 1(a), 1(b), FIG. 2, and FIG. 3, reference numeral 10 denotes a multifunctional desk of the present disclosure.

Configuration of Multifunctional Desk 10

Top Plate 12

Figure 1:
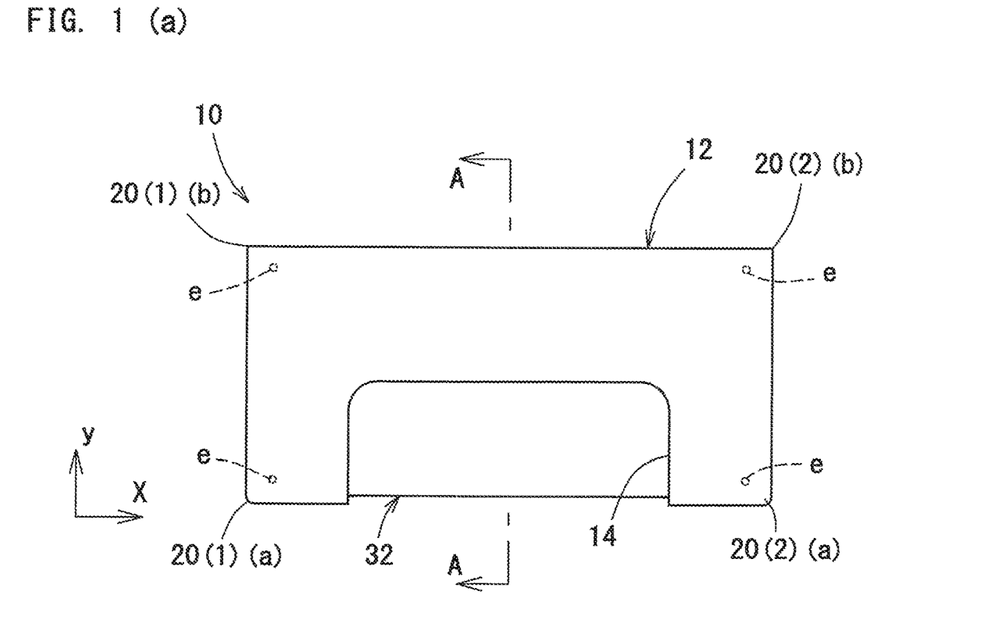
FIG. 1(a) is a plan view.
FIG. 1(b) is a front view.

The multifunctional desk 10 includes a top plate 12. As illustrated in FIG. 1(b), the top plate 12 is for placing displays 100, a keyboard 102, and the like thereon. A material of the top plate 12 may be wood, resin, metal or the like, and is not particularly limited; however, is preferably lightweight wood for easy transportation. As illustrated in FIG. 1(a), in plan view, the top plate 12 has a U-shape having a recess 14 for operating a controller 104 (illustrated in FIG. 1(b)) attached to a rotating plate 32 to be described later. The top plate 12 is preferably configured using, for example, a hard melamine decorative board. The melamine decorative board is a plywood whose surface is covered with a melamine resin. The melamine resin belongs to amino resin and is a synthetic resin produced by polycondensation of melamine and formaldehyde. The melamine resin has a Rockwell hardness of approximately M115 to 125, which is high. The melamine resin can be used even at approximately 110° C. to 130° C. and has high heat resistance. In addition, the melamine resin is excellent in water resistance, weather resistance, and abrasion resistance.

Suspended Members 30

Two right and left suspended members 30 are fixed to a lower surface 28 of the top plate 12 in front view. The suspended members 30 and the like are for fixing braces 22(1) (a) and the like, which will be described later.

Leg Portion 16

The multifunctional desk 10 includes a leg portion 16 for supporting the top plate 12 in the air. The leg portion 16 includes four support rods 18(1) (a), 18(1) (b), 18(2) (a) and 18(2) (b) which are perpendicular to the top plate 12 and have a rod shape. In FIG. 1(b), the support rod 18(1) (b) is located further back than the support rod 18(1) (a), and the support rod 18(2) (b) is located further back than the support rod 18(2) (a). The four support rods 18(1) (a) and the like are fixed to vicinities of four corner portions 20(1) (a), 20(1) (b), 20(2) (a) and 20(2) (b) of the top plate 12. A material of the four support rods 18(1) (a) and the like may be wood, resin, metal or the like, and is not particularly limited; however, is preferably metal or resin having high strength so that the top plate 12 can be stably supported. The four support rods 18(1) (a) and the like are fixed to the lower surface 28 of the top plate 12 by screwing male screws e (illustrated in FIG. 2), which are provided on upper ends 18(A) thereof, into female screws formed on the lower surface 28 of the top plate 12.

Figure 2:
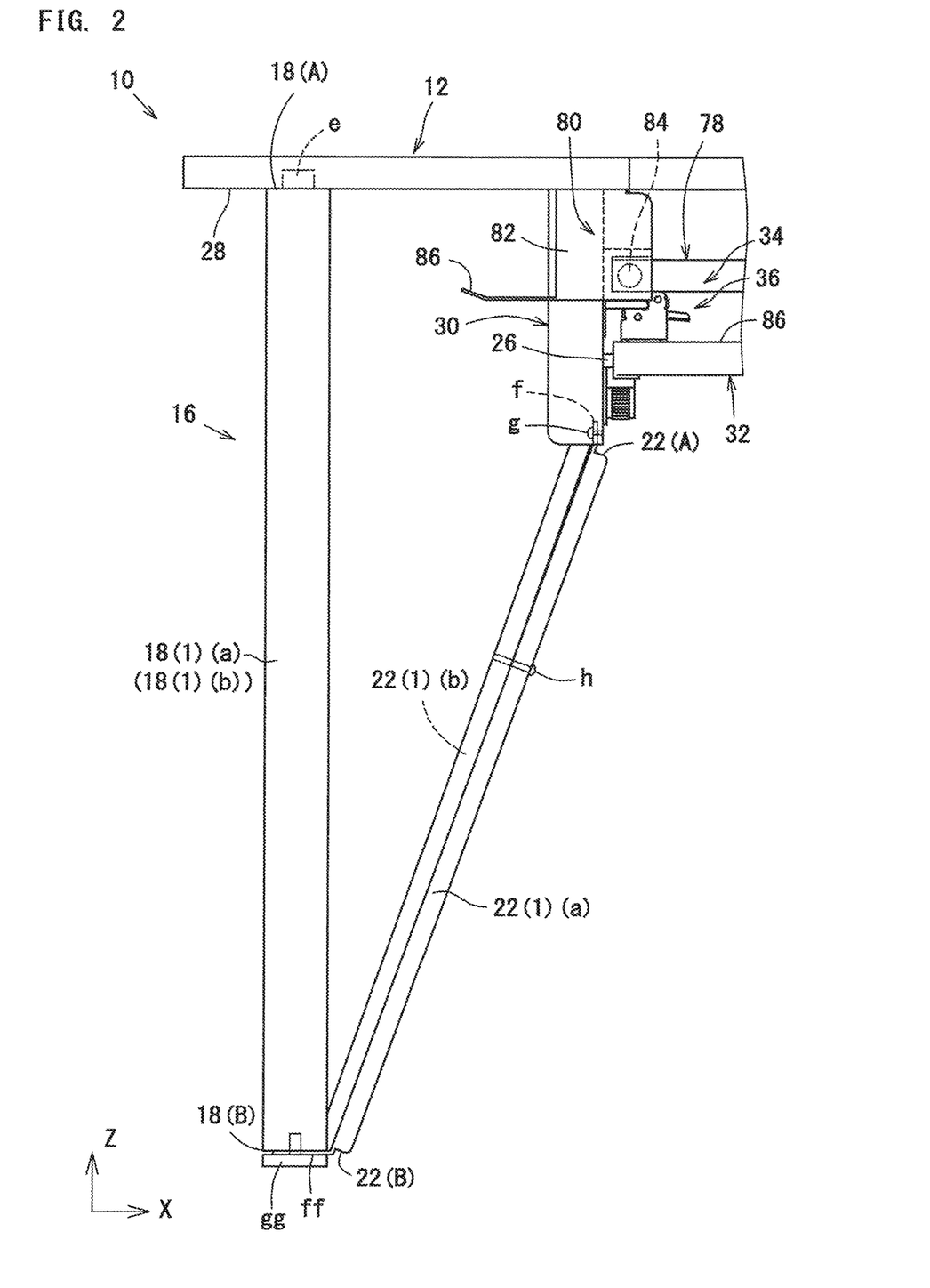
FIG. 2 is an enlarged front view of a main portion of the multifunctional desk illustrated in FIG. 1(b).

The leg portion 16 includes four rod-shaped braces 22(1) (a), 22(1) (b), 22(2) (a) and 22(2) (b) which extend diagonally in front view and side view. A material of the four braces 22(1) (a) and the like may be wood, resin, metal or the like, and is not particularly limited; however, is preferably metal or resin having high strength so that the top plate 12 can be stably supported. As illustrated in FIG. 2, each of the braces 22(1) (a) and the like has one end 22(A) and the other end 22(B). In the one end 22(A), a protruding piece f provided on the one end 22(A) is fixed to the suspended member 30 by a bolt (male screw) g. Moreover, a protruding piece ff provided on the other end 22(B) is sandwiched by a male screw gg and a lower end 18(B) of the support rod 18(1) (a) or the like, whereby the other end 22(B) is fixed to the lower end 18(B) of the support rod 18(1) (a) or the like. The two braces 22(1) (a) and 22(1) (b) (illustrated in FIG. 1(b)) located on the left side in front view intersect with each other in side view. Intermediate portions of the braces 22(1) (a) and 22(1) (b) are fixed to each other by a bolt h. In a similar way, the two braces 22(2) (a) and 22(2) (b) (illustrated in FIG. 1(b)) located on the right side in front view also intersect with each other in side view. Intermediate portions of the braces 22(2) (a) and 22(2) (b) are fixed to each other by a bolt h. The leg portion 16 is not composed of plate-shaped members which are heavy objects, but is composed of the rod-shaped support rods 18 and braces 22 for easy transportation.

Rotating Shaft 26

Figure 3:
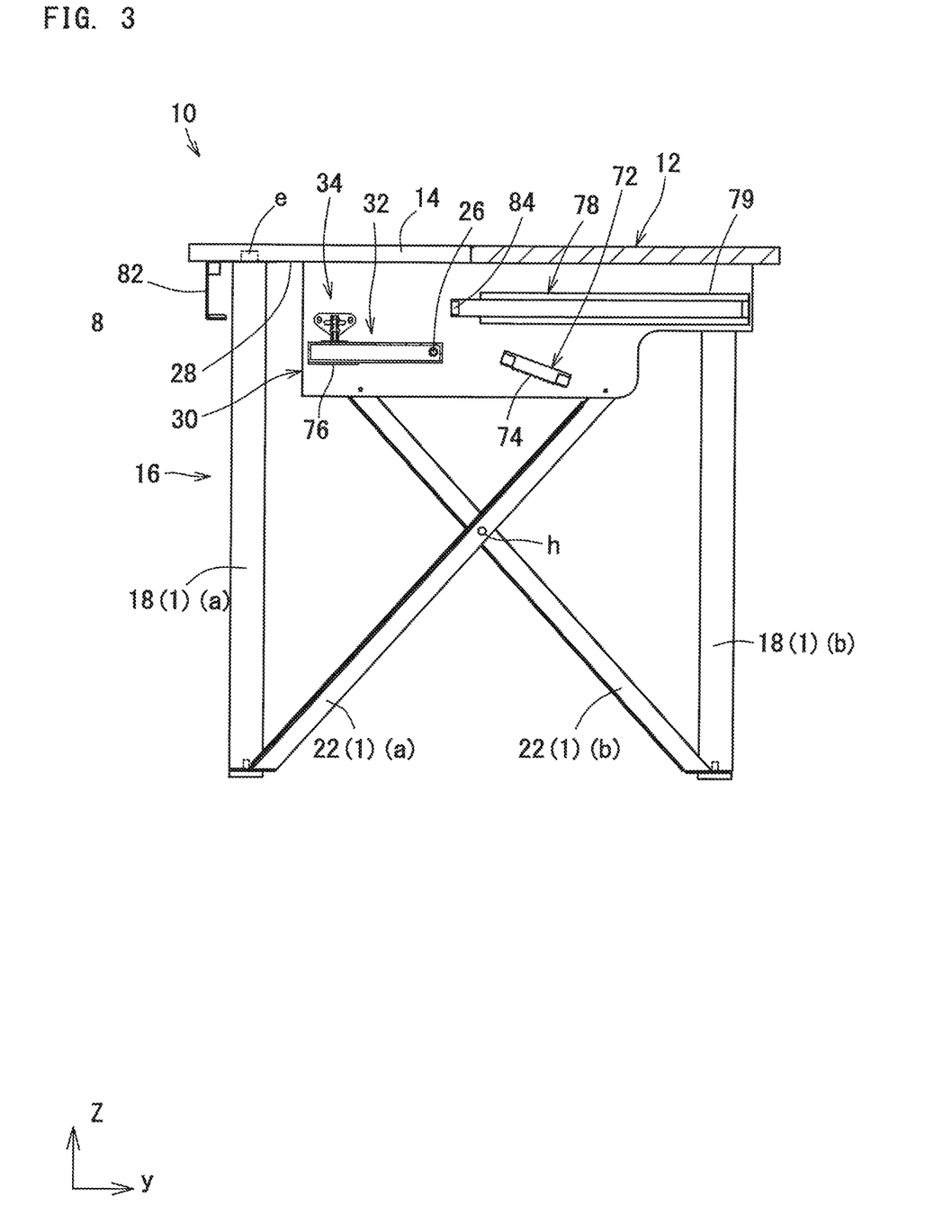
FIG. 3 is an enlarged cross-sectional view of a cut portion of the multifunctional desk illustrated in FIG. 1(a), taken along a line A-A.

As illustrated in FIGS. 2 and 3, the multifunctional desk 10 includes a rotating shaft 26 parallel to the top plate 12 and the front surface. The rotating shaft 26 is engaged with the suspended members 30 so as to be rotatable with respect to the suspended members 30. The rotating shaft 26 is configured to rotate below the top plate 12.

Rotating Plate 32

Figure 5:
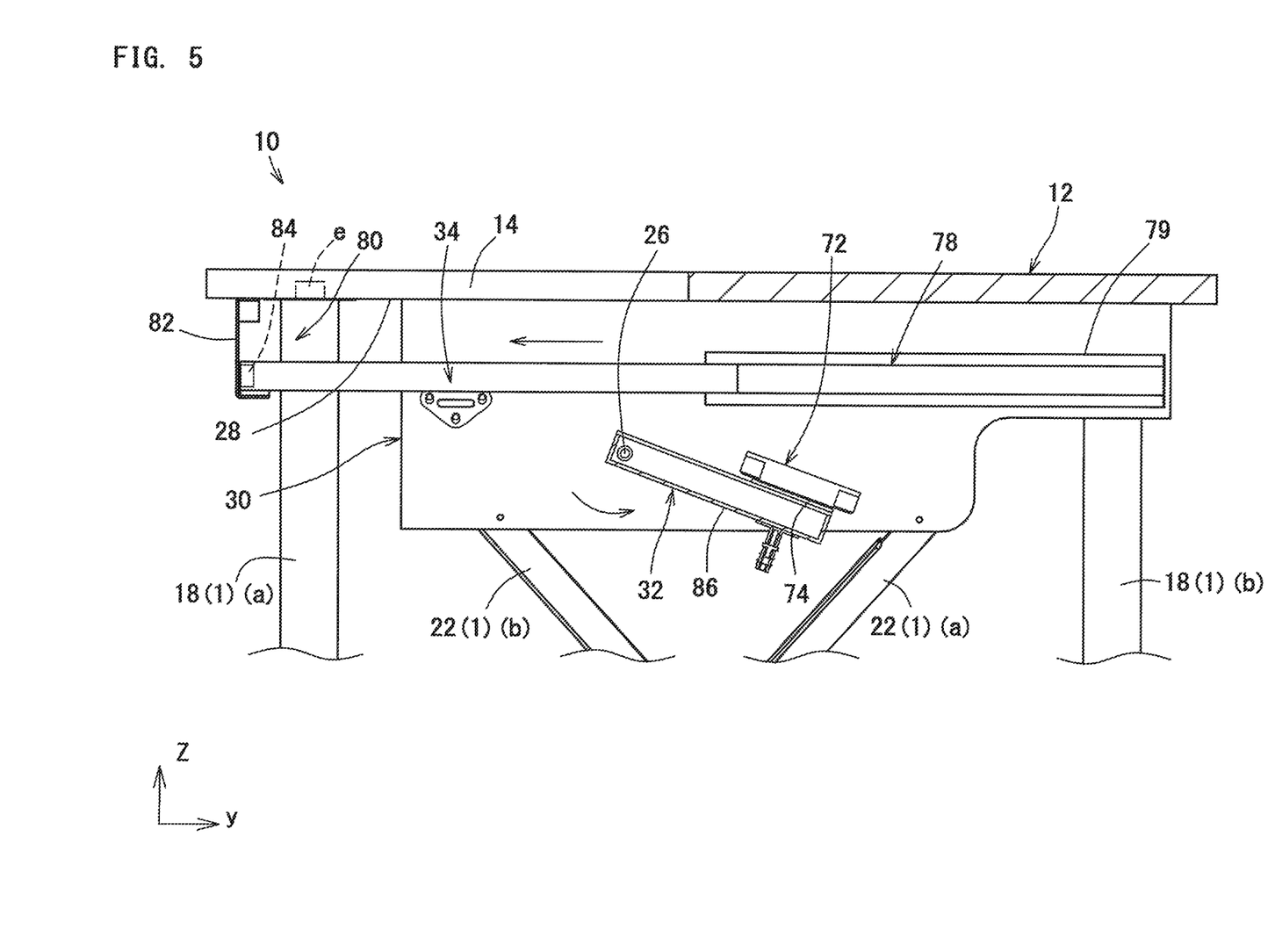
FIG. 5 is an enlarged cross-sectional view of a main portion of the cut portion of the multifunctional desk illustrated in FIG. 1(a), taken along the line A-A.

The multifunctional desk 10 includes the rotating plate 32 fixed to the rotating shaft 26. As illustrated in FIG. 1(b), the rotating plate 32 is for installing the controller 104 such as a control machine to play a game. Below the top plate 12, the rotating plate 32 is configured to protrude into the recess 14 of the top plate 12 and protrude in front of the top plate 12 in plan view by rotating about the rotating shaft 26 as a center of rotation. FIGS. 1(a), 1(b), FIG. 2, and FIG. 3 illustrate a state in which the rotating plate 32 protrudes in front of the top plate 12. Further, as illustrated in FIG. 5, the rotating plate 32 is configured to be retreated below the top plate 12 by rotating about the rotating shaft 26 as the center of rotation.

First Fixture 34

Figure 4:
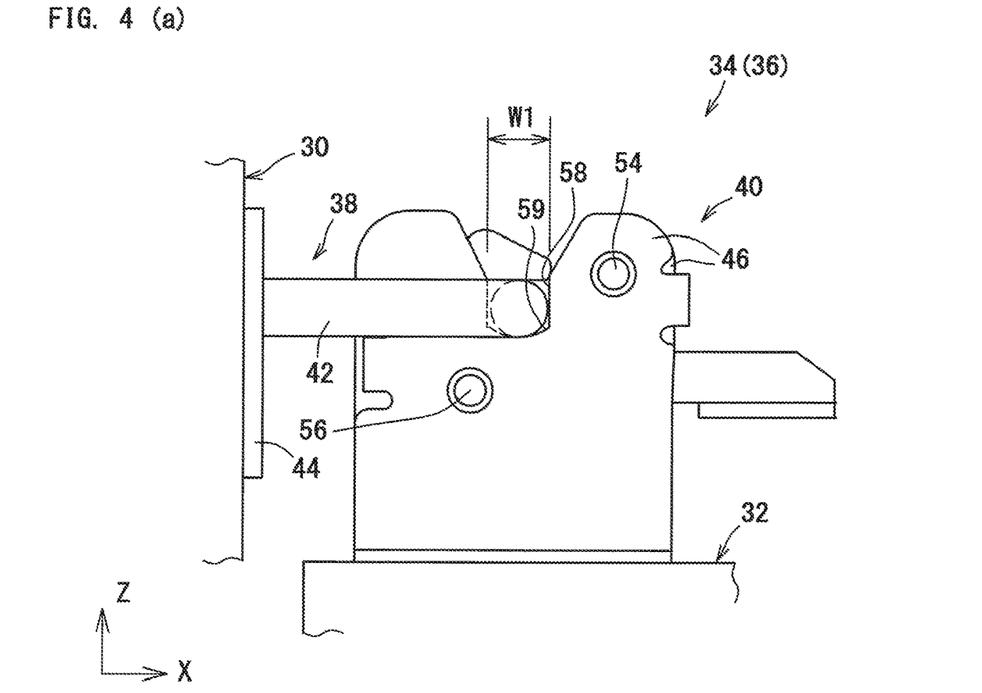
FIG. 4(a) is an enlarged front view.
FIG. 4(b) is an enlarged front cross-sectional view of a state where a front frame in front view is detached.

The multifunctional desk 10 includes a first fixture 34 that fixes the rotating plate 32 in a state of protruding in front of the top plate 12. The first fixture 34 is composed of two right and left locking devices 36 (illustrated in FIGS. 2 and 4). As illustrated in FIGS. 4(a) and 4(b), each of the locking devices 36 is composed of an engaged member 38 that is fixed to a side surface of the suspended member 30 and an engaging mechanism 40 that is fixed onto the rotating plate 32 and causes the engaged member 38 to be engaged therewith.

As illustrated in FIGS. 4(a) and 4(b), the engaged member 38 is composed of a U-shaped metal fitting 42 having a U-shape as a whole in plan view, and a fixed plate 44 that fixes the U-shaped metal fitting 42 and is fixed to the side surface of the suspended member 30 by a bolt (not shown). A cross section of the U-shaped metal fitting 42 is circular.

Engaging Mechanisms 40 (Horizontal Movement Restricting Section, Upward Rotation Restricting Section, Downward Rotation Restricting Section)

As illustrated in FIGS. 4(a) and 4(b), each of the engaging mechanisms 40 is composed of: two frames 46 which are parallel to each other and fixed onto the rotating plate 32 by a bolt (not shown); a first rotationally moving member 48 that is attached between the two frames 46 and rotationally moves with respect to the two frames 46; a second rotationally moving member 50 that is attached between the two frames 46, rotationally moves with respect to the two frames 46, and is engaged with the first rotationally moving member 48; and a tension spring 52 that couples the second rotationally moving member 50 to the first rotationally moving member 48.

The two frames 46 include: a first rotationally moving shaft 54 that constitutes a center of a rotational movement of the first rotationally moving member 48; and a second rotationally moving shaft 56 that constitutes a center of a rotational movement of the second rotationally moving member 50. Further, the two frames 46 are provided with recesses 58 into which the U-shaped metal fitting 42 is inserted.

As illustrated in FIG. 4(a), a width W1 of each of the recesses 58 in the horizontal direction (X-axis direction) is the same as a diameter of the cross section of the U-shaped metal fitting 42. Therefore, the recess 58 is configured to restrict a horizontal movement of the frames 46 fixed to the rotating plate 32 and restrict a horizontal movement of the rotating plate 32. That is, the engaging mechanism 40 including the recess 58 is configured to function as horizontal movement restricting section for restricting the horizontal movement of the rotating plate 32. Note that the rotating shaft 26 that is fixed to the rotating plate 32 and rotates with respect to the suspended member 30 also functions as horizontal movement restricting section. A lower surface 59 of the recess 58 is configured to contact the U-shaped metal fitting 42 in the frames 46. Thus, a configuration is adopted so that a movement of the frames 46 fixed to the rotating plate 32 in an upward direction (a direction in which the rotating plate 32 rotates upward about the rotating shaft 26 as the center of rotation) is restricted, and that a movement of the rotating plate 32 in the upward direction is restricted. That is, the engaging mechanism 40 including the recess 58 is configured to function as upward rotation restricting section for restricting the rotating plate 32 from rotating in the upward direction about the rotating shaft 26 as the center of rotation.

The first rotationally moving member 48 includes an engaging protrusion 60, and the second rotationally moving member 50 includes an engaging recess 62 into which the engaging protrusion 60 is inserted. The engaging protrusion 60 includes an engaging slope surface 64, and the engaging recess 62 includes an engaging slope surface 66 that contacts and engages with the engaging slope surface 64. The first rotationally moving member 48 includes a lever 68 for rotationally moving the first rotationally moving member 48 counterclockwise. The second rotationally moving member 50 is provided with a recess 70 into which the U-shaped metal fitting 42 is inserted. As illustrated in FIG. 4(b), a width W2 of the recess 70 in a Z-axis direction is the same as the diameter of the cross section of the U-shaped metal fitting 42. Moreover, the second rotationally moving member 50 is provided with a pressing slope surface 71 and a pressed protrusion portion 73 for attaching the engaging mechanism 40 to the U-shaped metal fitting 42 from a state in which the engaging mechanism 40 is disengaged from the U-shaped metal fitting 42 (details will be described later).

As illustrated in FIG. 4(b), in the engaging mechanism 40, when force N in a perpendicular direction (Z-axis direction) is urged from the U-shaped metal fitting 42 to the second rotationally moving member 50 due to a load of the rotating plate 32 and the controller (described later) attached to the rotating plate 32, a counterclockwise rotation torque T is urged to the second rotationally moving member 50. However, since the engaging slope surface 64 of the first rotationally moving member 48 and the engaging slope surface 66 of the second rotationally moving member 50 are engaged with each other, the second rotationally moving member 50 does not rotationally move counterclockwise due to resistance force P from the first rotationally moving shaft 54. In order for the engaging mechanism 40 to move downward, the second rotationally moving member 50 needs to rotate counterclockwise and be disengaged from the first rotationally moving member 48. However, the second rotationally moving member 50 is configured not to rotate counterclockwise unless such an engaged state of the engaging slope surface 64 and the engaging slope surface 66 is released. The engaging mechanism 40 is configured to restrict a movement of the engaging mechanism 40 fixed to the rotating plate 32 in a downward direction (a direction in which the rotating plate 32 rotates in a downward direction about the rotating shaft 26 as the center of rotation), and to restrict a movement of the rotating plate 32 in the downward direction. That is, the engaging mechanism 40 is configured to function as downward rotation restricting section for restricting the rotating plate 32 from rotating in the downward direction about the rotating shaft 26 as the center of rotation.

Figure 6:
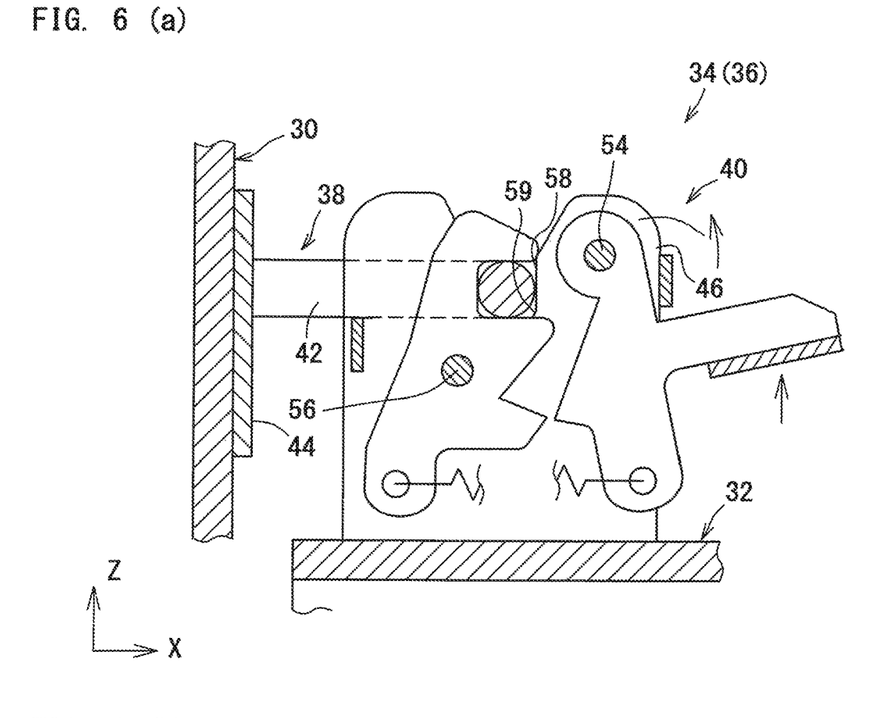
FIG. 6(a) is an enlarged front cross-sectional view illustrating a state where a lever is lifted.
FIG. 6(b) is an enlarged front cross-sectional view illustrating a state where an engaging mechanism is disengaged from an engaged mechanism.

As illustrated in FIG. 6(a), the first fixture 34 is configured to be capable of pushing up the lever 68, rotationally moving the first rotationally moving member 48 counterclockwise, and disengaging the engaging slope surface 64 from the engaging slope surface 66 of the second rotationally moving member 50. The first fixture 34 is configured to be capable of lowering (rotate counterclockwise) the rotating plate 32 from a state in which the engaging slope surface 64 is disengaged from the engaging slope surface 66, causing the U-shaped metal fitting 42 to push up the recess 70 of the second rotationally moving member 50, and as illustrated in FIG. 6(b), rotating the second rotationally moving member 50 counterclockwise, and disengaging the engaging mechanism 40 from the U-shaped metal fitting 42. That is, the first fixture 34 is configured to be capable, by simply pushing up the lever 68, of releasing the engagement between the first rotationally moving member 48 and the second rotationally moving member 50, and disengaging the engaging mechanism 40 from the U-shaped metal fitting 42.

Figure 7:
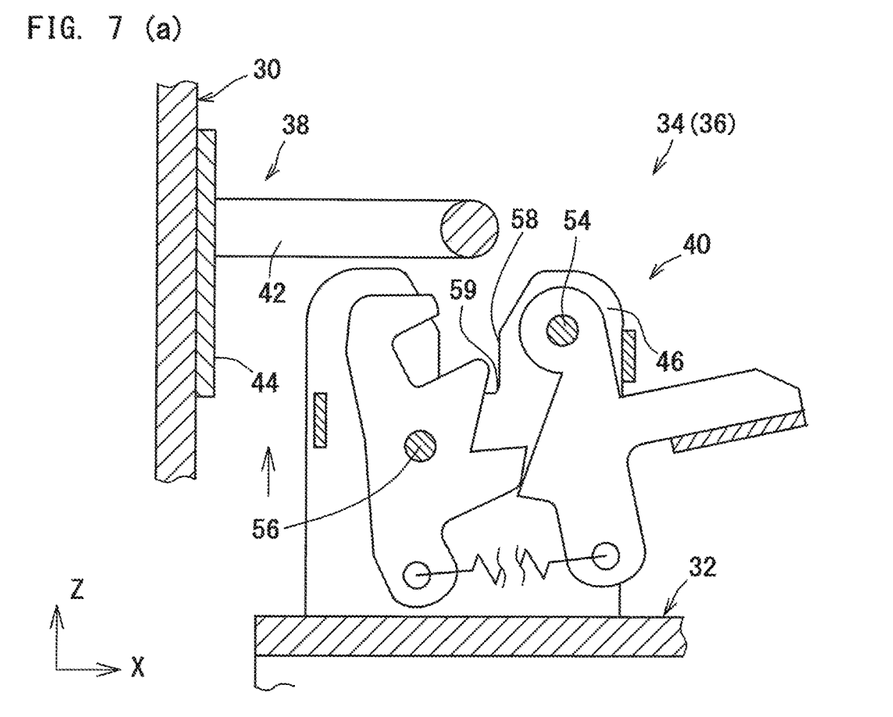
FIG. 7(a) is an enlarged front cross-sectional view illustrating a state where a rotating plate is lifted.
FIG. 7(b) is an enlarged front cross-sectional view illustrating a state where the engaging mechanism is engaged with the engaged mechanism.

The description is given above of the case of disengaging the engaging mechanism 40 from the U-shaped metal fitting 42. A description will be given below of a case of engaging the engaging mechanism 40 with the U-shaped metal fitting 42. As illustrated in FIGS. 7(a) and 7(b), the first fixture 34 is configured to be capable of lifting the rotating plate 32, and engaging the engaging mechanism 40, which is in a state of being disengaged from the U-shaped metal fitting 42, with the U-shaped metal fitting 42. The first fixture 34 is configured to lift the rotating plate 32 as illustrated in FIG. 7(a), to press the pressed protrusion portion 73 of the second rotationally moving member 50 by the U-shaped metal fitting 42 while engaging the U-shaped metal fitting 42 with the recess 58 of the frames 46 as illustrated in FIG. 7(b), and to thrust the pressing slope surface 71 of the second rotationally moving member 50 against the engaging protrusion 60 of the first rotationally moving member 48. The first fixture 34 is configured to be capable of rotationally moving the second rotationally moving member 50 clockwise as illustrated in FIG. 7(b) by pressing the pressing slope surface 71 against the engaging protrusion 60, thereafter moving the engaging slope surface 64 of the second rotationally moving member 50 below the engaging protrusion 60 of the first rotationally moving member 48, and engaging the engaging mechanism 40 with the U-shaped metal fitting 42 as illustrated in FIG. 4(b). That is, the first fixture 34 is configured to be capable of engaging the engaging mechanism 40 with the U-shaped metal fitting 42 and fixing the rotating plate 32 to the U-shaped metal fitting 42 only by lifting the rotating plate 32.

Second Fixture 72

The multifunctional desk 10 includes a second fixture 72 that fixes the rotating plate 32 in a state of being retreated below the top plate 12. As illustrated in FIG. 3, the second fixture 72 is composed of: magnets 74 fixed to the suspended members 30; and metal plates 76 fixed to a lower surface of the rotating plate 32. The second fixture 72 is configured to be capable of rotating the rotating plate 32, and as illustrated in FIG. 5, setting the rotating plate 32 to a state of being retreated below the top plate 12, and magnetically attaching the metal plates 76 to the magnets 74. That is, the second fixture 72 is configured to be capable of fixing the rotating plate 32 to the state of being retreated below the top plate 12 only by rotating the rotating plate 32. The magnets 74 are fixed to the suspended members 30 in a diagonal direction (not parallel to the top plate 12) so that the rotating plate 32 is in the diagonal direction as illustrated in FIG. 5 when the rotating plate 32 is retreated below the top plate 12. This is in order to create a more space above the rotating plate 32 when the rotating plate 32 is fixed to the magnets 74 for the purpose of increasing the versatility of the controller and game components, which are attached to the rotating plate 32. Note that the magnets 74 are for improving workability (storability or setting). For a case where the magnets 74 are not used for a long time, for example, a configuration may be adopted so that hooks are provided on the second fixture 72, and that the rotating plate 32 is fixed by the hooks. The configuration of the second fixture 72 may be the same as the configuration of the first fixture 34. A method for fixing the magnets 74 to the suspended members 30 is not particularly limited.

Slide Plate 78

As illustrated in FIG. 3, the multifunctional desk 10 includes a slide plate 78 configured to protrude in front of the top plate 12 or to be retreated below the top plate 12 by sliding in parallel to the top plate 12. The slide plate 78 is for being protruded in front of the top plate 12 to place thereon personal computer instruments such as a keyboard and a mouse. The slide plate 78 is configured to slide along rails 79 fixed to the suspended members 30. The slide plate 78 is provided below the top plate 12 and above the rotating plate 32. It is desirable that the slide plate 78 have a gap between the slide plate 78 and the top plate 12 so as to be capable of being housed in a state in which the keyboard, the mouse and the like are placed thereon.

Third Fixture 80

As illustrated in FIGS. 2 and 5, the multifunctional desk 10 includes a third fixture 80 configured to fix the slide plate 78 in a state of protruding in front of the top plate 12. The third fixture 80 is composed of: a metallic vertical plate 82 fixed to the lower surface 28 of the top plate 12; and a magnet 84 fixed to a front end of the slide plate 78 and magnetically attached to the vertical plate 82. The vertical plate 82 includes a headphone hook 86 (illustrated in FIG. 2) for hooking headphones (not shown).

Actions and Effects

As illustrated in FIGS. 1(a) and 1(b), the multifunctional desk 10 of the present disclosure has the one or plurality of displays 100, the keyboard 102, a personal computer body, an external memory and the like placed on the top plate 12, and a game by the controller 104 is played in a state in which the controller 104 is fixed to the rotating plate 32. The content of the game is displayed on the displays 100. At this time, the rotating plate 32 is fixed to the suspended members 30 and the top plate 12 by the first fixture 34 in a state of protruding in front of the top plate 12 (below the recess 14 of the top plate 12). At this time, the slide plate 78 is retreated below the top plate 12. There are various types of controllers, such as a type that operates a steering wheel and a type that operates a lever of a fighter or the like. An operator selects one or more preferred controllers and installs the selected controllers on the rotating plate 32.

When transition is carried out from a state in which the game by the controller 104 is played to a state in which office work is performed, then as illustrated in FIG. 6(a), the lever 68 of the engaging mechanism 40 is pushed up in a state in which the controller 104 or the rotating plate 32 is held by hand, and as illustrated in FIG. 6(b), the engaging mechanism 40 is disengaged from the U-shaped metal fitting 42 of the engaged member 38. As illustrated in FIG. 5, the rotating plate 32 is rotated counterclockwise, and the metal plates 76 fixed to the rotating plate 32 are magnetically attached to the magnets 74 fixed to the suspended members 30. Thus, the rotating plate 32 is fixed to the suspended members 30 and the top plate 12 in a state of being retreated below the top plate 12, and the controller 104 fixed to the rotating plate 32 is fixed to the suspended members 30 and the top plate 12 in a state of being retreated below the top plate 12. Office work using the multifunctional desk 10 is performed by the displays 100 and the keyboard 102 on the top plate 12.

According to the multifunctional desk 10 of the present disclosure, the fixed state of the rotating plate 32 to the suspended members 30 and the top plate 12 can be released only by pushing up the levers 68 of the engaging mechanisms 40. Further, the controller 104 can be fixed below the top plate 12 by rotating counterclockwise the rotating plate 32 to which the controller 104 is fixed. Therefore, without detaching the controller 104 from the multifunctional desk 10, the transition can be easily carried out from the state in which the game by the controller 104 is performed to the state in which the office work is performed.

When the transition is carried out from the state in which the office work is performed using the multifunctional desk 10 to the state in which the game by the controller 104 is performed, then in the state in which the controller 104 or the rotating plate 32 is held by hand, the rotating plate 32 in the state of being retreated below the top plate 12 is rotated clockwise, and as illustrated in FIGS. 7(a) and 7(b), the rotating plate 32 is lifted, the engaging mechanisms 40 in the state of being disengaged from the U-shaped metal fittings 42 are engaged with the U-shaped metal fittings 42, and the rotating plate 32 is fixed to the suspended members 30 and the top plate 12 in a state of protruding in front of the top plate 12. The game by the controller 104 is played.

According to the multifunctional desk 10 of the present disclosure, the rotating plate 32 to which the controller 104 is fixed can be rotated clockwise, can be protruded in front of the top plate 12, and can be fixed to the suspended members 30 and the top plate 12. Therefore, without performing work of fixing the controller 104, the transition can be carried out easily from the state in which the office work is performed using the multifunctional desk 10 to the state in which the game by the controller 104 is performed.

Further, according to the multifunctional desk 10 of the present disclosure, the leg portion 16 is composed of: the four support rods perpendicular (in the Z-axis direction) to the top plate; and the four braces extending diagonally in front view and side view, and can withstand loads in the X-axis, Y-axis and Z-axis directions, and the rotating plate 32, the top plate 12 and the like do not vibrate or swing in the X-axis, Y-axis, and Z-axis directions. Moreover, the first fixture 34 includes: the horizontal movement restricting section for restricting the horizontal movement of the rotating plate 32 to which the controller 104 is fixed; the upward rotation restricting section for restricting the rotating plate 32 from rotating upward about the rotating shaft 26 as the center of rotation; and the downward rotation restricting section for restricting the rotating plate 32 from rotating downward about the rotating shaft 26 as the center of rotation. Therefore, even if the control steering wheel of the controller 104 is strongly moved, the rotating plate 32 to which the controller 104 is fixed does not vibrate or swing in the X-axis, Y-axis, and Z-axis directions. Here, in the game, fine movements of the control steering wheel and buttons of the controller 104 affect a flow and result of the game. However, according to the multifunctional desk 10, the rotating plate 32 and the like do not vibrate or swing in the X-axis, Y-axis, and Z-axis directions, whereby the control steering wheel and buttons of the controller 104 do not vibrate or swing in the X-axis, Y-axis, and Z-axis directions, and therefore, the controller 104 can be operated accurately. Since the slide plate 78 is fixed by the magnets 84, the slide plate 78 does not swing, either, so that an accurate mouse operation can be performed. Note that the multifunctional desk 10 can withstand a load of at least about 100 kg by including the four braces. The top plate 12 can withstand a load of at least about 70 kg. The rotating plate 32 can withstand a load of at least about 25 kg. The slide plate 78 can withstand a load of at least about 25 kg.

Figure 8:
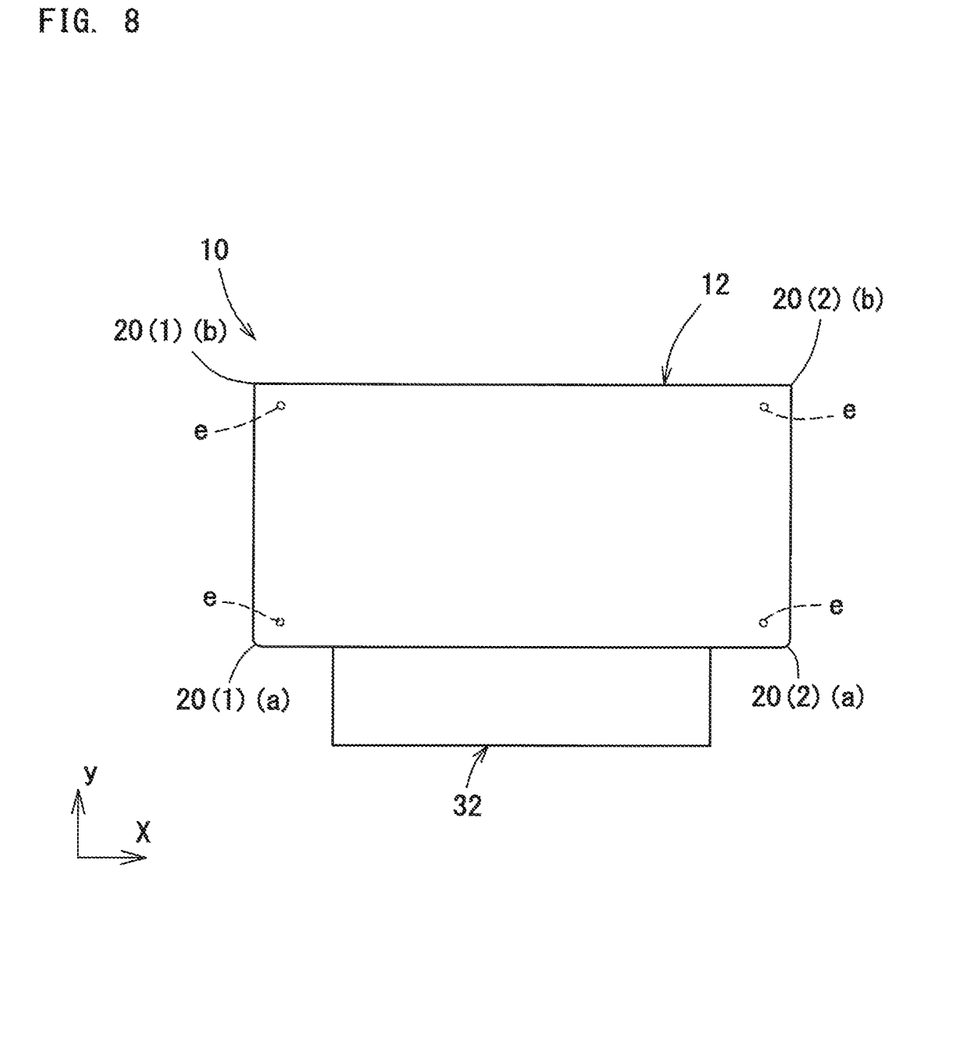
FIG. 8 is a plan view illustrating another embodiment of the multifunctional desk according to the present disclosure.

Although the description is given above of one embodiment of the present disclosure, the present disclosure is not limited to the embodiment mentioned above. For example, as illustrated in FIG. 8, the shape of the top plate 12 may be a rectangle instead of the U shape in plan view. In this case, the rotating plate 32 is composed to have a size large enough to protrude in front of the top plate 12.

Although the description is given above of the embodiment of the present disclosure with reference to the drawings, the present disclosure is not limited to the illustrated embodiment. For example, the slide plate 78 does not have to be provided in particular. Further, the first fixture is not particularly limited as long as the rotating plate 32 can be firmly fixed to the top plate 12.

DESCRIPTION OF REFERENCE NUMERALS

10 Multifunctional desk
12 Top plate
14 Recess
16 Leg portion
18 Support rod
20 Corner portion
22 Brace
26 Rotating shaft
28 Lower surface
30 Suspended member
32 Rotating plate
34 First fixture
36 Locking device
38 Engaged member
40 Engaging mechanism
42 U-shaped metal fitting
68 Lever
72 Second fixture
74 Magnet
76 Metal plate
78 Slide plate
80 Third fixture
82 Vertical plate
84 Magnet
100 Display
102 Keyboard
104 Controller

The invention claimed is:
1. A multifunctional desk for a person located in front that is a front side to play a game, comprising:

a top plate;
a leg portion that supports the top plate;
a suspended member fixed to the top plate;
a rotating shaft engaged with the suspended member and provided below the top plate and parallel to the top plate, the rotating shaft being a rod-shaped shaft rotatable with respect to the suspended member;
a rotating plate provided below the top plate, the rotating plate configured to protrude in front of the top plate or be retreated below the top plate by rotating about the rotating shaft as a center of rotation;
a first fixture configured to fix the rotating plate relative to the top plate or release the rotating plate from being fixed relative to the top plate in a state of protruding in front of the top plate;
a second fixture configured to fix the rotating plate relative to the top plate or release the rotating plate from being fixed relative to the top plate in a state of being retreated below the top plate; and
a slide plate provided below the top plate and above the rotating plate, the slide plate configured to protrude in front of the top plate or be retreated below the top plate by sliding in parallel to the top plate, wherein
when the rotating plate is fixed relative to the top plate by the first fixture, the rotating plate is parallel to the top plate.

2. The multifunctional desk according to claim 1, further comprising
a third fixture configured to fix the slide plate in a state of protruding in front of the top plate.

3. The multifunctional desk according to claim 2, wherein the leg portion includes
four support rods which have a rod shape perpendicular to the top plate and are fixed to vicinities of corner portions of the top plate and
four braces each of which has a rod shape having a first end fixed relative to the top plate and a second end fixed to a lower end of the support rod and extends diagonally in front view and side view, and
two of the four braces are located on a left side in front view and intersect with each other and are fixed to each other, and two of the four braces are located on a right side in front view and intersect with each other and are fixed to each other.

4. The multifunctional desk according to claim 3, wherein the first fixture includes
a horizontal movement restricting section configured to restrict a horizontal movement of the rotating plate,
an upward rotation restricting section configured to restrict the rotating plate from rotating upward about the rotating shaft as a center of rotation, and
a downward rotation restricting section configured to restrict the rotating plate from rotating downward about the rotating shaft as a center of rotation.

5. The multifunctional desk according to claim 2, wherein the first fixture includes
a horizontal movement restricting section configured to restrict a horizontal movement of the rotating plate,
an upward rotation restricting section configured to restrict the rotating plate from rotating upward about the rotating shaft as a center of rotation, and
a downward rotation restricting section configured to restrict the rotating plate from rotating downward about the rotating shaft as a center of rotation.

6. The multifunctional desk according to claim 1, wherein the leg portion includes
four support rods which have a rod shape perpendicular to the top plate and are fixed to vicinities of corner portions of the top plate, and
four braces each of which has a rod shape having a first end fixed relative to the top plate and a second end fixed to a lower end of the support rod and extends diagonally in front view and side view, and
two of the four braces are located on a left side in front view and intersect with each other and are fixed to each other, and two of the four braces are located on a right side in front view and intersect with each other and are fixed to each other.

7. The multifunctional desk according to claim 6, wherein the first fixture includes
a horizontal movement restricting section configured to restrict a horizontal movement of the rotating plate,
an upward rotation restricting section configured to restrict the rotating plate from rotating upward about the rotating shaft as a center of rotation, and
a downward rotation restricting section configured to restrict the rotating plate from rotating downward about the rotating shaft as a center of rotation.

8. The multifunctional desk according to claim 1, wherein the first fixture includes
a horizontal movement restricting section configured to restrict a horizontal movement of the rotating plate,
an upward rotation restricting section configured to restrict the rotating plate from rotating upward about the rotating shaft as a center of rotation, and
a downward rotation restricting section configured to restrict the rotating plate from rotating downward about the rotating shaft as a center of rotation.

9. A multifunctional desk for a person located in front that is a front side to play a game, comprising:
a top plate;
a leg portion that supports the top plate;
a suspended member fixed to the top plate;
a rotating shaft engaged with the suspended member and provided below the top plate and parallel to the top plate, the rotating shaft being a rod-shaped shaft rotatable with respect to the suspended member;
a rotating plate provided below the top plate, the rotating plate configured to protrude in front of the top plate or be retreated below the top plate by rotating about the rotating shaft as a center of rotation;
a first fixture configured to fix the rotating plate relative to the top plate or release the rotating plate from being fixed relative to the top plate in a state of protruding in front of the top plate; and
a second fixture configured to fix the rotating plate relative to the top plate or release the rotating plate from being fixed relative to the top plate in a state of being retreated below the top plate,
wherein
the top plate has a U shape having a recess in plan view,
the rotating plate protrudes in front of the top plate in the recess of the top plate in plan view by rotating about the rotating shaft as a center of rotation, and
when the rotating plate is fixed relative to the top plate by the first fixture, the rotating plate is parallel to the top plate.

* * * * *